Patented Mar. 27, 1923.

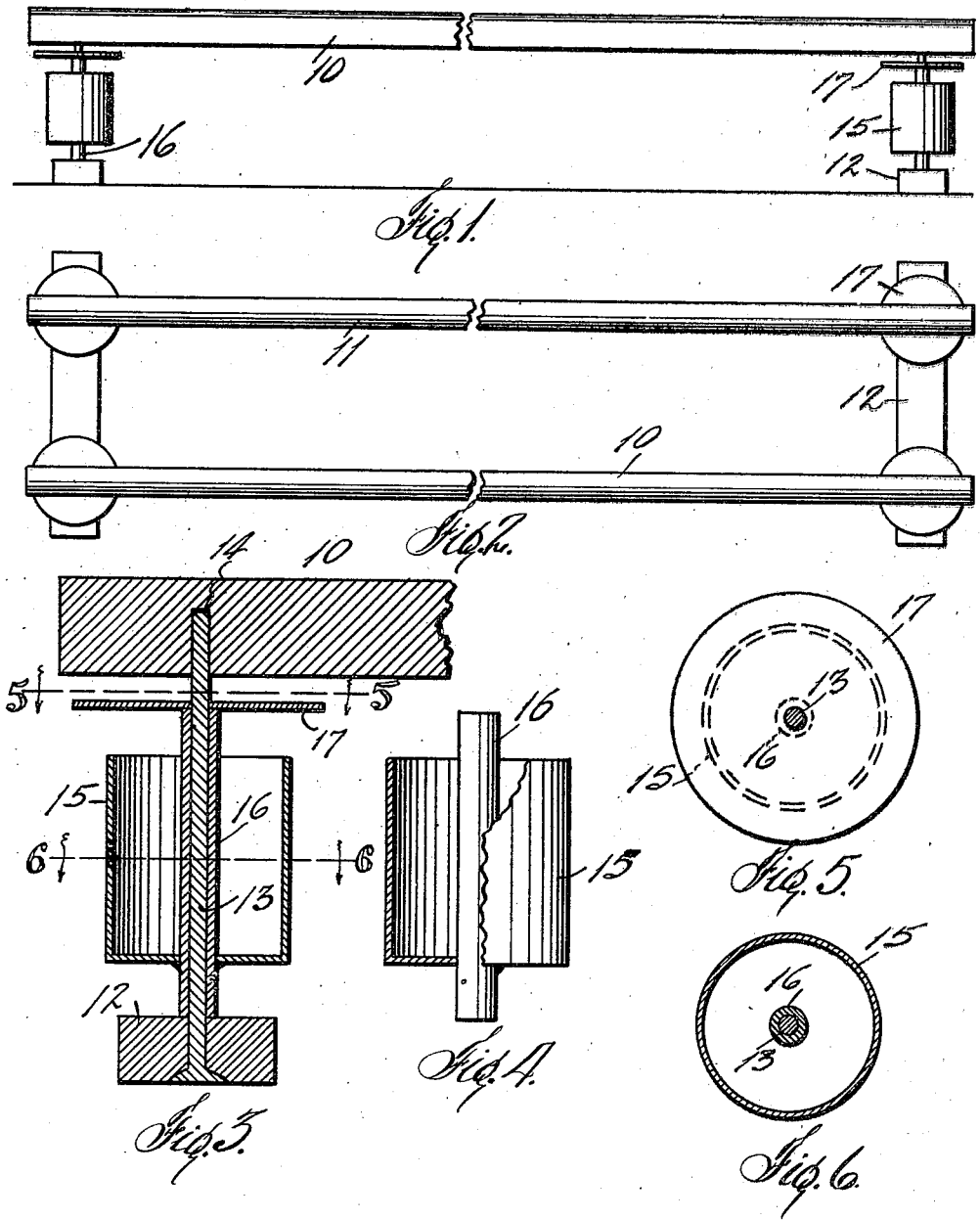

1,449,612

UNITED STATES PATENT OFFICE.

JERERD R. LYON, OF BYERS, TEXAS.

CHICKEN ROOST.

Application filed November 27, 1922. Serial No. 603,510.

*To all whom it may concern:*

Be it known that I, JERERD R. LYON, a citizen of the United States, residing at Byers, in the county of Clay and State of Texas, have invented certain new and useful Improvements in Chicken Roosts, of which the following is a specification.

This invention relates to new and useful improvements in chicken roosts.

The object of the invention is to provide a roost structure wherein the supports of the roosting bars or beams are equipped with containers for holding an insect exterminating liquid or powder, whereby insects are prevented from crawling up to the roosts and those which infect the fowls are prevented from crawling from the roost structure.

A particular object is to provide an insecticide cup having an integral sleeve extending above and below the cup and adapted to fit around a roost-supporting post, whereby the cup is supported the base of the post and an insect guard disk may be supported above the cup and the roost bars.

Another object is to provide a roost which may be quickly disassembled and the parts thoroughly cleaned and easily replaced.

A device designed to carry out the invention will be hereinafter described together with other features of the invention.

The invention will be more readily understood from a reading of the following specification and by reference to the accompanying drawings, wherein:

Fig. 1 is a front elevation of a roost constructed in accordance with my invention, Fig. 2 is a plan view of the same, Fig. 3 is an enlarged vertical sectional view of one of the supports, Fig. 4 is an enlarged detail of one of the insecticide cups, Fig. 5 is a cross-sectional view on the line 5—5 of Fig. 3, and Fig. 6 is a cross-sectional view on the line 6—6 of Fig. 3.

In the drawings the numeral 10 designates a longitudinal roost bar or beam and 11 a similar beam or bar placed parallel thereto. It is to be understood that as many bars as are desired may be used. As a base I have shown two cross members or sills 12 disposed under each end of the bars, but other suitable supporting means may be used. For the end of each bar an upright post 13 is provided and for this purpose a flat-headed bolt may be inserted from the bottom of the sill with the head countersunk. Each end bar is provided in its under side with an upwardly extending socket 14 which receives the upper end of the post, whereby the bar is supported and the upper surface thereof kept free from perforations or projections.

An important feature of the invention is an insecticide cup 15 of cylindrical formation with an open top. A sleeve 16 extends axially of the cup and has sufficient length to extend above and below the same. The sleeve is of such diameter as to fit on the post, but free enough to be easily removed therefrom. A cup and sleeve are provided for each post.

The sleeve in each instance rests upon the sill 12 and thus supports the cup in an elevated position. The sleeve which projects above the cup has resting thereon a guard disk 17 which is centrally perforated to receive the post 13. The disk is thus supported above the cup and below the bar at each end thereof. Each disk preferably has a larger diameter than the cup making it impossible for insects crawling up the outer sides of the cups to jump onto the disks.

The cups are filled with crude oil, poison or any other insecticide either of a liquid or powder form. Fowls are often infected with vermin and some species are difficult to exterminate if allowed to leave the fowls and infect the poultry house. With my invention the insects can not leave the fowls and crawl to them as is obvious.

The construction of the cup and sleeve is very important and by making them integral and by eliminating packing nuts or washers a much more simple and inexpensive structure is had and the sleeve has the dual function of supporting both the cup and the guard disk. The ease and quickness with which the cup may be removed and replaced is a great advantage, particularly where a number of roosts are to be cleaned. The readily removable bars are also very desirable. The sills may be supported on a dropping board or other support.

Various changes in the size and shape of the parts as well as modifications and alterations may be made, within the scope of the appended claims and without departing from the spirit of the invention.

What I claim, is:

1. In a chicken roost, a roosting bar having sockets in its under side, cross sills, upright posts extending from the sills and having their upper ends engaging in the sockets of the bars for supporting the latter, a sleeve mounted on each post and resting on the sill, each sleeve having its upper end terminating below the bottom of the bar, a cup integral with the sleeve and having its bottom above the sill and its top below the top of the sleeve, and a guard disk mounted on each post and resting on the sleeve below the bar.

2. In a chicken roost, an elongated roosting bar, upright posts supporting the bars at their upper ends, sleeves removably mounted and slidable on the posts, said sleeves having their upper ends terminating below the bar, cups integrally mounted on the sleeves intermediate the ends thereof, and guard disks mounted on the posts and resting upon the sleeves blow the bar.

In testimony whereof I affix my signature.

JERERD R. LYON.